United States Patent
Rao et al.

(10) Patent No.: US 8,888,137 B2
(45) Date of Patent: Nov. 18, 2014

(54) SERVICEABLE SEATBELT BUCKLE AND TENSIONER ASSEMBLY

(75) Inventors: Manoharprasad K. Rao, Novi, MI (US); Curtis David Kalina, South Lyon, MI (US); Richard Edward Ruthinowski, Taylor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/555,742

(22) Filed: Jul. 23, 2012

(65) Prior Publication Data

US 2014/0021710 A1    Jan. 23, 2014

(51) Int. Cl.
*B60R 22/36* (2006.01)
*B60R 22/195* (2006.01)

(52) U.S. Cl.
CPC ............. *B60R 22/1951* (2013.01); *B60R 22/36* (2013.01)
USPC .......................................... 280/806; 297/480

(58) Field of Classification Search
CPC  B60R 22/1951; B60R 22/1955; B60R 22/36; B60R 22/38; B60R 22/40; B60R 22/405
USPC .......... 280/806; 297/480, 478, 476, 477, 472
See application file for complete search history.

(56) References Cited

U.S. PATENT DOCUMENTS

| | | | |
|---|---|---|---|
| 5,188,425 A | 2/1993 | Foster et al. | |
| 5,397,075 A | 3/1995 | Behr | |
| 5,676,397 A | 10/1997 | Bauer | |
| 5,911,440 A * | 6/1999 | Ruddick et al. | 280/806 |
| 6,039,352 A | 3/2000 | Wier | |
| 6,149,242 A | 11/2000 | Pesta et al. | |
| 6,264,281 B1 | 7/2001 | Dukatz et al. | |
| 6,659,548 B2 | 12/2003 | Becker et al. | |
| 6,851,715 B2 * | 2/2005 | Devereaux et al. | 280/806 |
| 6,874,817 B2 * | 4/2005 | Nakano et al. | 280/805 |
| 7,168,742 B2 * | 1/2007 | Tomita | 280/806 |
| 7,172,218 B2 * | 2/2007 | Nakano et al. | 280/806 |
| 8,011,696 B2 * | 9/2011 | Singer | 280/806 |
| 8,016,362 B2 * | 9/2011 | Itoga | 297/471 |
| 8,196,962 B2 * | 6/2012 | Sugiyama et al. | 280/806 |
| 2006/0118347 A1 * | 6/2006 | Zelmer et al. | 180/268 |

* cited by examiner

*Primary Examiner* — Drew Brown
(74) *Attorney, Agent, or Firm* — Shook Hardy & Bacon, LLP

(57) ABSTRACT

A serviceable seatbelt buckle mounted belt tensioner for use with a vehicle seat having a seat frame includes a bracket fixed to the seat frame and a pre-tensioning assembly releasably attached to the bracket, the pre-tensioning assembly includes a housing, a seatbelt attachment portion such as a seatbelt buckle, a cylindrical container and a cable connecting the seatbelt buckle and the cylindrical container, the cable passing through the housing. Both the bracket and the housing include attachment interfaces in the forms of flanges, tabs, pins, and slots. A fastener such as a screw or a clip is used to prevent movement of the housing relative to the bracket once the components are fitted together.

11 Claims, 13 Drawing Sheets

SERVICEABLE SEATBELT BUCKLE AND TENSIONER ASSEMBLY

BACKGROUND OF THE INVENTION

1. Technical Field

The invention disclosed herein relates generally to belt tensioners for seatbelt systems. More particularly, the present invention relates to a serviceable seatbelt buckle and tensioner assembly that is readily removed and re-installed.

2. Description of the Prior Art

In the area of occupant protection in a vehicle, the ever-increasing use of seatbelt tensioners has achieved a level where almost every new vehicle now includes one of these devices as part of its safety system.

One popular variation of the seatbelt tensioner is the seatbelt buckle and belt tensioner assembly, which is well-known. The seatbelt buckle and belt tensioner assembly may also be referred to herein using such terms as buckle tensioner, buckle tensioner assembly, buckle mounted tensioner or buckle mounted belt tensioner. The buckle portion of a buckle tensioner is releasably attachable to a tongue that is slidably affixed to a vehicle's seatbelt assembly by buckling once the occupant is in the seat. In the event, or anticipation, of sudden deceleration of the vehicle, an on-board sensor senses the abrupt change in vehicle motion and generally causes an electrical signal to be sent to an energy generating device such as a deployable pyrotechnic, stored gas or electric device or component. For example, one well known from of energy generating pyrotechnic device includes a cartridge, typically fluidly connected to a generally enclosed cylindrical container having a piston or similar feature movably fitted therein. The piston is commonly attached to the seatbelt buckle by a cable or similar flexible load carrying member. When the energy generating device is activated by the signal received from the sensor, an expanding gas is delivered from the cartridge to the interior of the cylinder by way of the fluid connection, the resultant gas pressure effecting movement of the piston and pulling on the seatbelt buckle by way of the interfacing cable connection. The seatbelt is thus tensioned and is tightened against a belted occupant in the seat.

The advent of forward-looking sensing for vehicles (pre-impact, predictive sensing or threat detection), vehicular stability control, lane departure, rollover, pedestrian, foreign object, occupant awareness detection and/or similar predictive impact or loss of vehicle control sensing, has opened the prospect of deploying restraint countermeasures prior to the occurrence of an actual impact or loss of vehicular control, etc. As many of these technologies contain predictive logic, it is conceivable that a buckle mounted belt tensioning device may be pre-activated in anticipation of a collision that may ultimately be avoided by the driver, thus increasing the frequency of need for removal, replacement or re-installation of a seatbelt buckle tensioner. In addition, like other deployable pyrotechnic or stored gas types of devices used in vehicle safety systems, such as air bags, many seatbelt buckle-mounted belt tensioners are currently capable of single-event usage. These devices are generally intended to deploy in moderate to severe impact events. After a single deployment, such buckle mounted belt tensioners must be replaced. Belt tensioner assembly access may also be required to otherwise service, calibrate, or reset a vehicles reusable or resettable buckle mounted belt tensioning device.

In consideration of an increased need for servicing and replacing buckle mounted belt tensioners, ease of serviceability becomes a relevant factor in the design of these devices. In the case of known buckle mounted belt tensioners, the attachment features in many cases are inaccessible and the devices cannot be easily removed, reinstalled or replaced without necessitating the detachment and removal of either or both of the complete vehicle seat, and/or center console assembly based on tool clearance and package space limitations. Removal of either or both of these assemblies is labor intensive and costly. In addition to increased inconvenience and expense, removal of either the vehicle seat or the console to facilitate belt tensioner replacement increases the risk of functional or cosmetic handling damage to these or nearby interior components, introduction of squeak and rattle issues, disconnected or damaged wiring or electrical connections, etc., given the substantial content incorporated in the modern vehicle seat, such as heating and cooling elements, electric motors, bladders, pumps, seat track mechanisms, electric and manual lever controls, occupant classification systems and associated electrical wiring and connections.

Accordingly, there is a need in the art of seatbelt buckle mounted belt tensioners for a system that may be readily serviced without the need of removing adjacent components such as the vehicle seat or the console.

BRIEF DESCRIPTION

The disclosed invention in its various embodiments overcomes the challenges associated with servicing buckle mounted belt tensioners according to the prior art. Particularly, the disclosed invention in its various embodiments provides enhanced serviceability and replacement friendly buckle and belt tensioner assembly configurations that preclude the need for removal of such interior items as vehicle seats, center consoles or other assemblies that may be in proximity to a buckle mounted belt tensioner assembly when removing, replacing and/or re-installing said assembly. This, in turn, significantly reduces service and replacement time, associated costs, and minimizes the likelihood of causing functional or cosmetic damages to peripheral interior components or assemblies during the service process.

In general, the various embodiments of the invention provide attachment interfaces between the buckle mounted belt tensioner assembly and the mating vehicle seat structure, frame, frame rail, seat track structure or other load carrying component of the seat assembly. Often, the buckle mounted belt tensioner is affixed to a moveable seat track structure.

More particularly, the vehicle seat and seatbelt tensioning system as disclosed herein includes a load carrying mounting component generally attached to a structural member of the seat, such as the seat track assembly. The mounting component may include one or more interfacing engagement surfaces, typically in the form of a flange, hook, tab, structural stud or pin, aperture or similar feature or combination of features that may be an extension of, integral to, or otherwise attached to the mounting component with which the buckle mounted belt tensioner is positively engaged. Elongated slots, notches and/or tab(s) may be included for alignment, part-to-part engagement and/or anti-rotation purposes. While the mounting component may generally be represented by a bracket affixed to a structural member of the seat, the load carrying mounting component may alternatively be represented by an extension of a structural member of the seat itself, made integral to such a member during the manufacturing process, and would also incorporate one or more interfacing engagement surfaces, slots, notches, tabs and the like.

The seatbelt tensioning portion of the system includes a buckle mounted belt tensioner assembly comprising such functional items as a housing, an interfacing seatbelt tongue connection feature (generally in the form of a seatbelt buckle), a driving piston or similar feature, a generally cylindrical container and a cable which at least partially passes through the housing. The housing further includes one or more engagement surfaces or features which may take the form of a hook, flange, tab, structural stud or pin, aperture or similar feature that may be an extension of, integral to, or otherwise attached to the body of the housing or cylindrical container. Elongated slots, notches and/or tab(s) may be included for alignment, part-to-part engagement and/or anti-rotation purposes and may extend or be formed on the seat frame bracket or affixed to it.

Structural studs or pins located on the seats mounting component, the buckle mounted belt tensioner housing, cylindrical container, or similar component may have an oversized end cap incorporating any of a plurality of geometries to achieve locking engagement between the load carrying mounting component and the buckle mounted belt tensioner assembly.

The mounting component of the seat and the belt tensioner assembly housing, or cylindrical container, may be locked in engagement with one another by a fastener such as a screw or a clip, or similar item, or a combination of the same.

Further features of the invention will be apparent from the attached drawings and description of illustrative embodiments of the invention.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
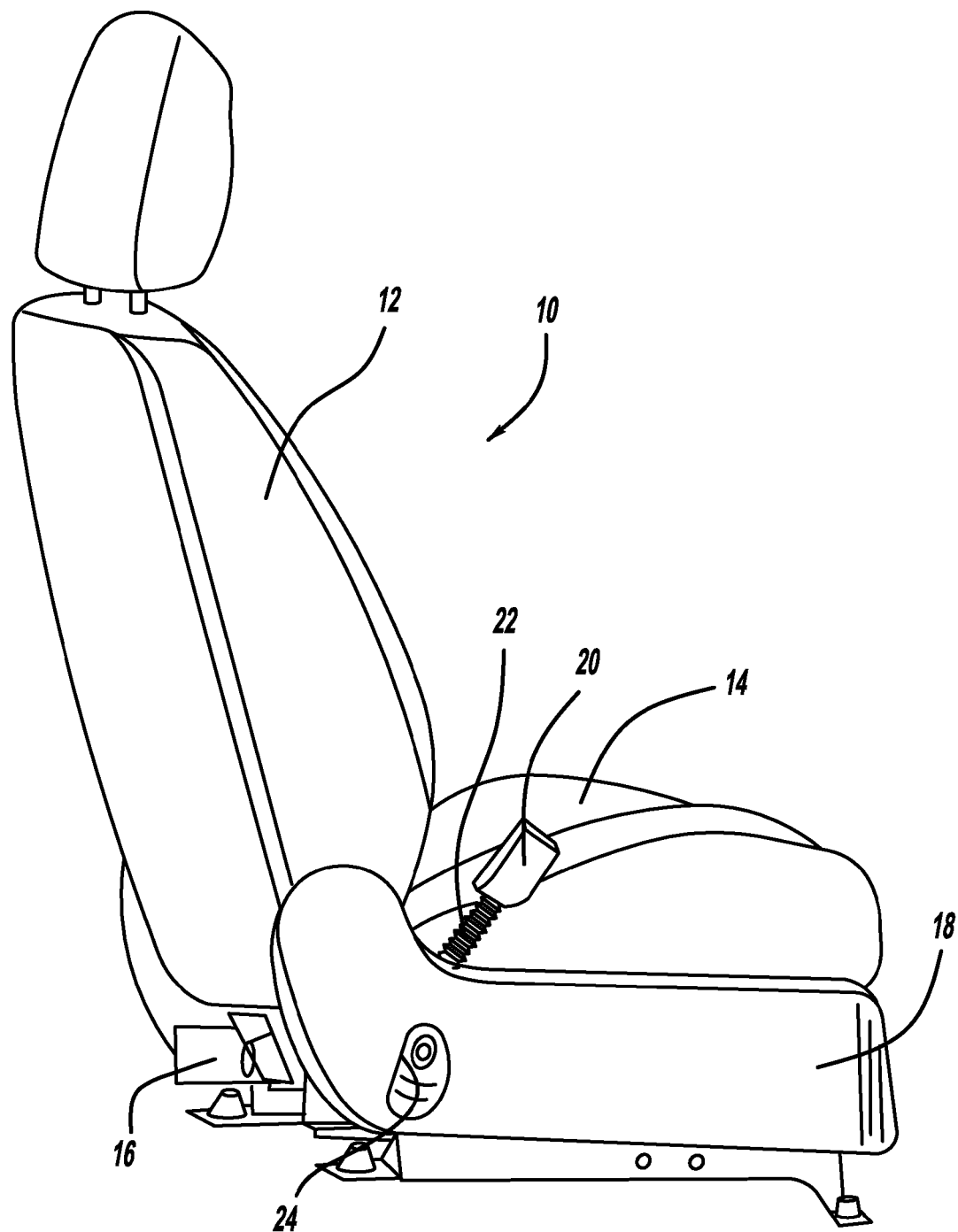
FIG. 1 illustrates a perspective view of a vehicle seat and seatbelt arrangement according to the present invention.

In the following figures, the same reference numerals will be used to refer to the same components. In the following description, various operating parameters and components are described for one constructed embodiment. These specific parameters and components are included as examples and are not meant to be limiting.

With respect to FIG. 1, a seat assembly, generally illustrated as 10, is shown in perspective view. The seat assembly 10 includes a generally upright seat back 12 and a generally horizontal seat base 14. A seat frame 16 is provided between the seat base 14 and the vehicle floor. The seat back 12, the seat base 14 and the seat frame 16 are conventional components and are shown here as illustrations only as other configurations may be possible.

A seat side shield (buckle mounted belt tensioner assembly cover) 18 is often attached to the vehicle inward side of the seat base 14. If included, cover 18 may be releasably attached to one or more of the seat base 14, seat frame 16 or other components of the seat assembly 10 (not shown) and generally covers much of the underlying buckle mounted belt tensioner assembly, of which portions, including a seatbelt buckle 20 and a flexible sheath 22 (if equipped), are typically visible. A service access port 24 may optionally be provided in the seat side shield (buckle mounted belt tensioner assembly cover) 18. An alternative assembly cover known in the art may be used. Similarly, an alternate cable known in the art may be used.

Figure 2:
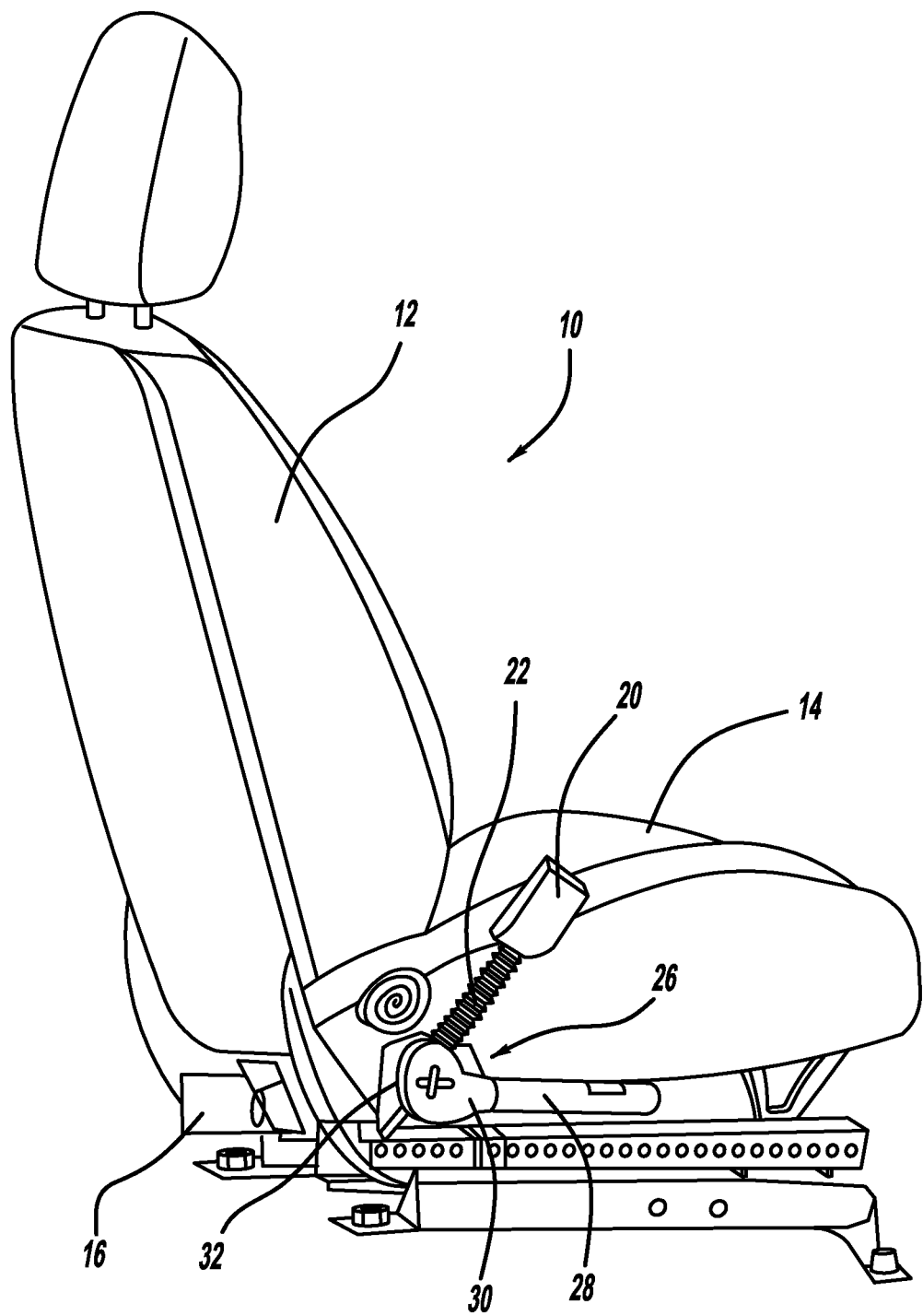
FIG. 2 illustrates the same view as FIG. 1 but shows instead the seat side shield (buckle mounted belt tensioner assembly cover) removed.

FIG. 2 depicts the same view of the seat assembly 10 as shown in FIG. 1, except that the seat side shield (buckle mounted belt tensioner assembly cover) 18 is removed and a serviceable buckle mounted belt tensioner assembly 26 is shown. The serviceable buckle mounted belt tensioner assembly 26 includes the seatbelt buckle 20 and the flexible sheath 22 (if equipped). The serviceable buckle mounted belt tensioner assembly 26 further includes a generally enclosed cylindrical container 28 attached to a serviceable buckle mounted belt tensioner assembly housing 30. The geometries and orientations of the assembly housing 30 and cylindrical container 28 may differ from that depicted in FIG. 2.

The cylindrical container 28 includes an energy generating deployable device (not shown) as is known in the art, which, upon receiving a signal from a sensing device, generates a gas that drives a piston or similar feature internal to the cylindrical container 28. The piston (not shown) pulls on a cable (shown in FIG. 3) that is attached to the seatbelt buckle 20. This arrangement is consistent with the teaching in the art. Buckle mounted belt tensioner assembly 26 may incorporate alternative hardware in lieu of a piston or cable as is known in the art.

The serviceable buckle mounted belt tensioner assembly 26 is releasably attached to a seat mounting component 32. The seat mounting component 32 is attached to, or extends from, a member of the seat frame 16, such as a frame rail, the seat track structure, track rail or other load carrying member of the seat assembly 10 that forms, or is attached to, part of the seat frame 16.

Figure 3:
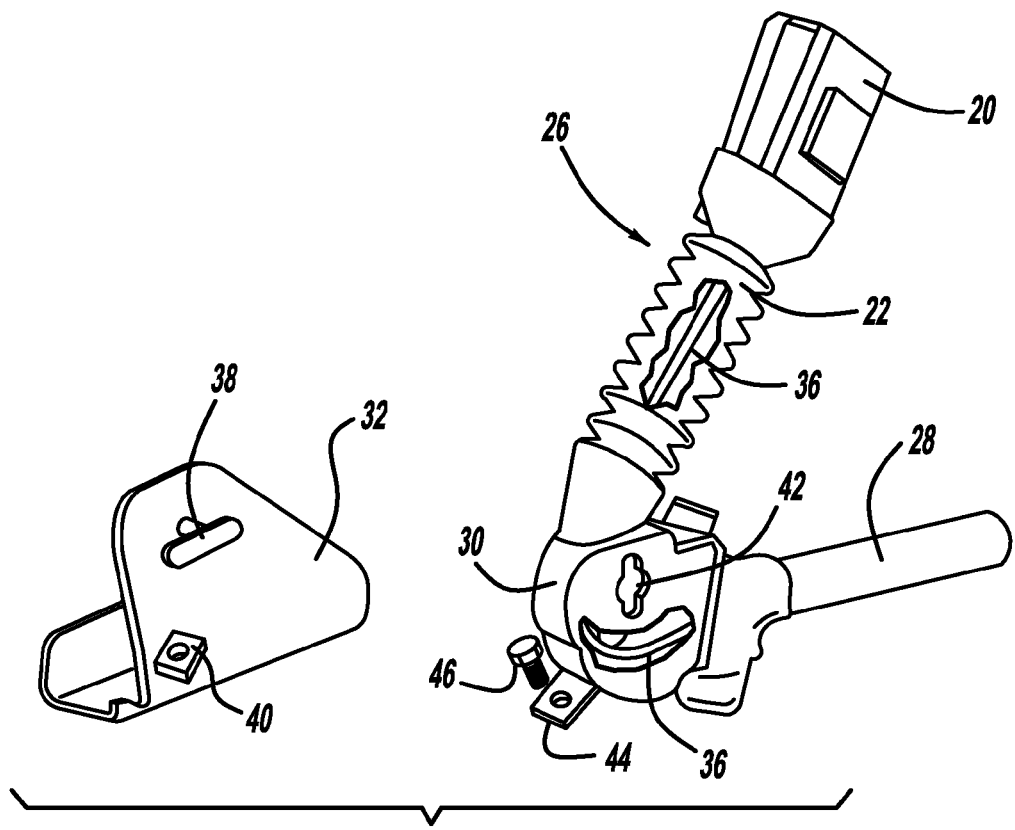
FIG. 3 illustrates a perspective view of the serviceable buckle mounted belt tensioner assembly according to an embodiment of the present invention in relation to its associated seat mounting component.

Referring to FIG. 3, a detailed view of the serviceable buckle mounted belt tensioner assembly 26 is shown detached from the seat mounting component 32. A cable 36 is visible through a cut away portion of both the flexible sheath 22 and the housing 30 for illustration purposes. As noted above, the cable 36 generally physically connects the seatbelt buckle 20 to the axially movable piston (not shown) housed within the cylindrical container 28. It is to be understood that the arrangement of a cable connecting the seatbelt buckle to the movable piston as shown in FIG. 3 with respect to the serviceable buckle mounted belt tensioner assembly 26 is the same preferred arrangement for the serviceable buckle mounted belt tensioner assemblies discussed below and shown in the accompanying figures.

A structural stud or pin 38 with a T-shaped head protrudes from the seat mounting component 32, as does a locating and attachment tab or bracket 40. Both the structural pin 38 and the tab or bracket 40 may be integral with, or affixed to, the mounting component 32. The T-shaped head of the structural pin 38 may be oriented at a preferred angle above the horizontal plane. The buckle mounted belt tensioner housing 30 contains a keyway opening 42 which matches the shape of head of the structural pin 38 and may be oriented along the vertical plane (90°), for example. A housing locating and attachment tab or bracket 44 (having a threaded aperture or fitted with a weldnut, not shown [weldnuts may be used in relation to flanges in all embodiments of the disclosed invention as needed and may be used in conjunction with other known fastening elements]) extends from the housing 30 and may be integral with, or attached to, the housing. Tabs or brackets 40 and 44 may additionally serve the purpose of limiting or preventing rotation of the buckle mounted belt tensioner assembly 26 when activated and/or loaded by an occupant in a collision or as a result of a pre-impact, driver notification or vehicle re-stabilization activation. The size, shape and orientation of the structural pin 38, the head of structural pin 38 and of keyway opening 42, as well as the geometries, locations and orientations of tabs or brackets 40 and 44, may differ from that represented in this embodiment, for the benefit of component or system package space, manufacturing assembly, service accessibility, or for functional performance reasons in various applications.

FIG. 3 depicts a configuration in which installation consists of rotating the serviceable buckle mounted belt tensioner assembly 26 counterclockwise approximately 45° to align the keyway opening 42 with the head of the structural pin 38. The serviceable buckle mounted belt tensioner assembly 26 is then slid onto the structural pin 38 until the head of the structural pin 38 protrudes beyond the exterior surface of the housing 30. The serviceable buckle mounted belt tensioner assembly 26 is then rotated clockwise until the housing tab or bracket 44 makes contact with tab or bracket 40 on the seat mounted bracket 32. A fastener such as a threaded fastener 46 is then driven through both the tab or bracket 44 and tab or bracket 40 to secure the serviceable buckle mounted belt tensioner assembly 26 in place. Tabs or brackets 40 and 44 are depicted in an orientation that generally enables convenient tool accessibility to the fastener 46. Removal is performed in the reverse order.

For conventional systems, the cross-vehicle clearance required to install or remove the buckle mounted belt tensioner assembly 26 includes consideration of such items as tool head thickness, socket head length, and the distance the fastener must travel to be sufficiently engaged or disengaged. For the invention disclosed in FIG. 3 the package space required for service is comprised only of the cross-vehicle thickness of buckle mounted belt tensioner assembly 26 combined with the thickness of geometrically shaped head of the structural pin 38. Fastener engagement and disengagement is achieved in a fore/aft direction rather than a cross-car direction. Similar advantages may be obtained through other embodiments of the disclosed invention as set forth in other figures and as discussed in relation thereto.

The embodiment of the serviceable buckle mounted belt tensioner assembly and its method of attachment to the seat mounted bracket discussed above is the first of several configurations envisioned by the present invention. Several alternate embodiments are set forth as follows.

Figure 4:
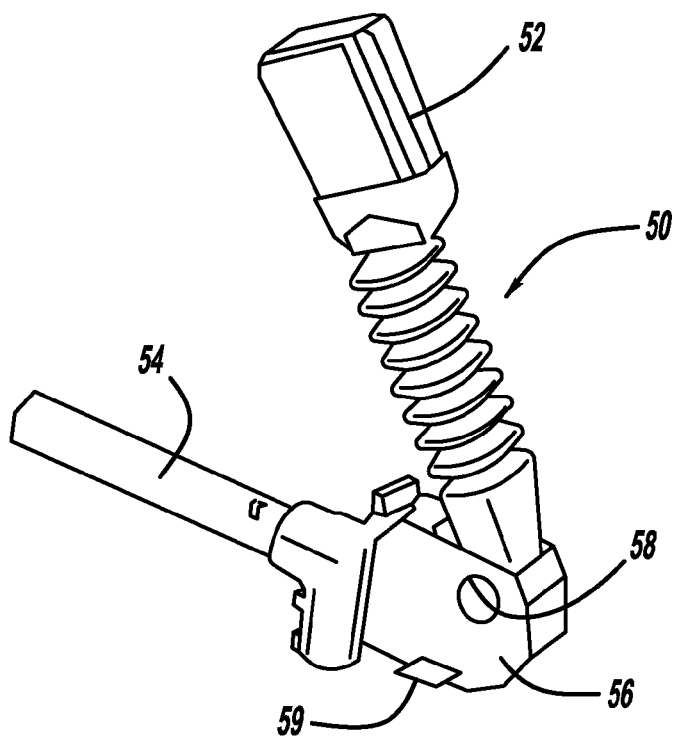
FIG. 4 illustrates a perspective view of one side of the first alternative embodiment of the serviceable buckle mounted belt tensioner assembly according to the present invention.
Figure 5:
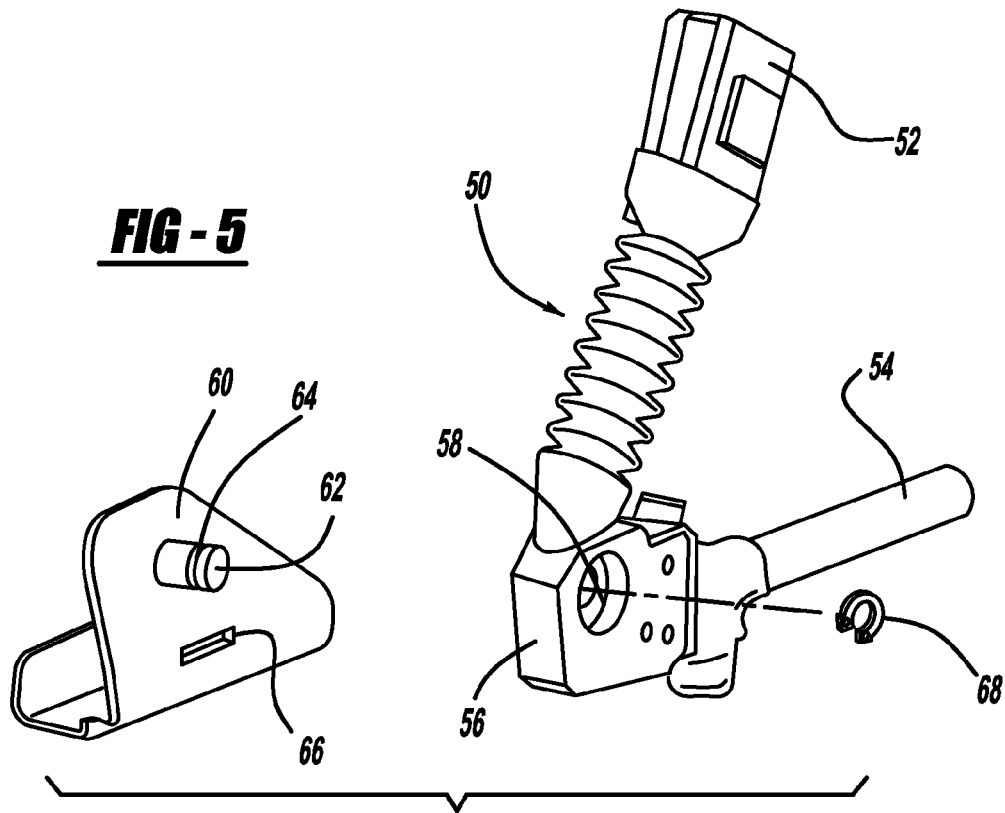
FIG. 5 illustrates a perspective view of the other side of the embodiment of the serviceable buckle mounted belt tensioner assembly shown in FIG. 4, additionally illustrating the associated seat mounting component.

With respect to FIGS. 4 and 5, a first alternate embodiment of the present invention is illustrated. Specifically, a serviceable buckle mounted belt tensioner assembly 50 is shown and includes a seatbelt buckle 52 and a cylindrical container 54. The seatbelt buckle 52 and the cylindrical container 54 are attached to a housing 56. A pin aperture 58 is formed through the housing 56. A locating and anti-rotation tab 59 extends laterally from the inner side of the housing 56. A seat mounted bracket 60 is provided for attachment to a structural member of the seat assembly (not shown). A load carrying attachment stud or pin 62 is integral with, or attached to, the seat mounted bracket 60. At least one radial groove 64 is formed on the attachment stud pin 62. A aperture or slot 66 is defined in the seat mounted bracket 60.

Installation of the serviceable buckle mounted belt tensioner assembly 50 on the seat mounted bracket 60 initially includes the alignment of the attachment stud pin 62 with the pin aperture 58 and alignment of the locating tab 59 with the slot 66. Once in alignment, the serviceable buckle mounted belt tensioner assembly 50 is fitted against the seat mounted bracket 60. A clip 68 or a similar fastener is fitted to the radial groove 64 to secure the attachment of the pretensioner 50 to stud pin 62 on seat mounted bracket 60. For enhanced packaging efficiency, a stepped diameter with a flat interior surface may be included on the inside of aperture 58, to provide a recessed opening in the housing for the fastener to engage and retain the buckled-mounted belt tensioner, reducing lateral package space utilization for the assembled system. Removal is performed in the reverse order.

It is understood by those skilled in the art that the geometry, location and orientation of the tab 59 and slot 66 may differ from the specific representation described in this embodiment when implemented. Similarly, radial groove 64 may be represented instead by threads and the like and clip 68 may be represented by a variety of geometries or replaced by a threaded nut or similar fastener.

Figure 6:
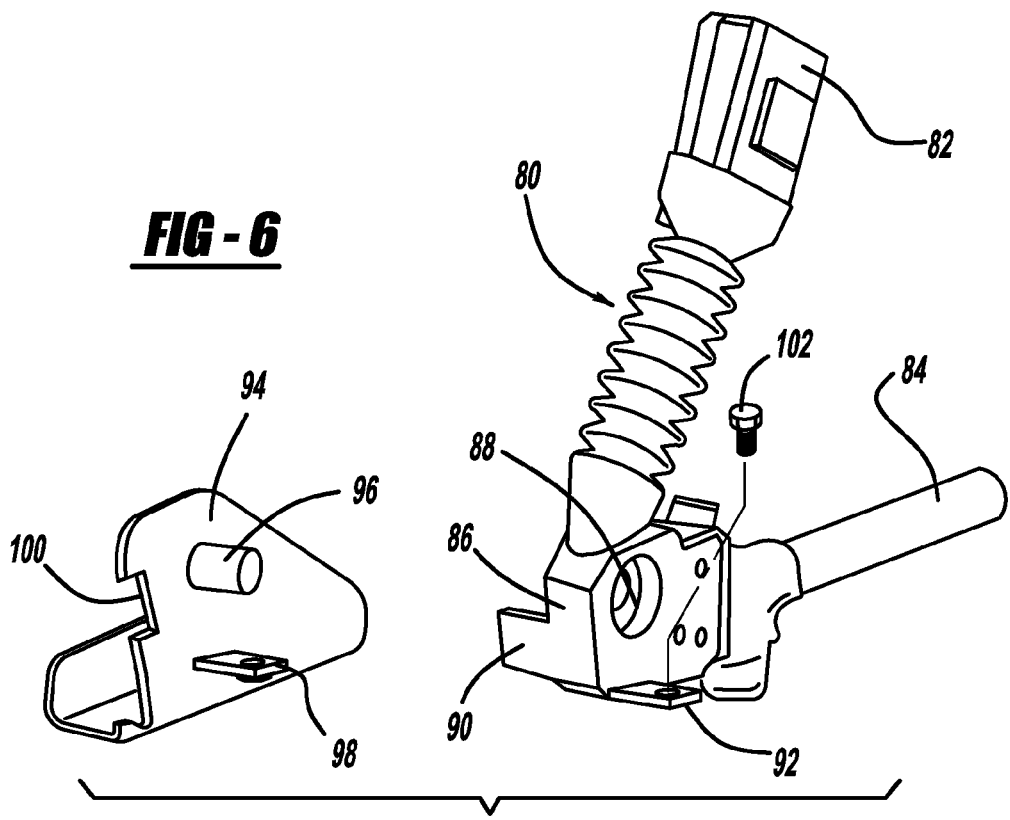
FIG. 6 illustrates a perspective view of a second alternate embodiment of the serviceable buckle mounted belt tensioner assembly of the present invention shown in relation to its associated seat mounting component.

With respect to FIG. 6, a second alternate embodiment of the present invention is illustrated. Specifically, a serviceable buckle mounted belt tensioner assembly 80 is shown and includes a seatbelt buckle 82 and a cylindrical container 84. The seatbelt buckle 82 and the cylindrical container 84 are attached to a housing 86. A pin aperture 88 is formed through the housing 86. A locating tab 90 extends laterally from the rear or rear inner side of the housing 86. An attachment tab 92 also extends laterally, but from the outer side of the housing 86. A seat mounted bracket 94 is provided for attachment to a structural member of the seat assembly (not shown). A load carrying pin 96 is fitted to and extends from the seat mounted bracket 94. A small bracket 98 (having a threaded aperture or fitted with a weldnut) also extends from the seat mounted bracket 94. Tab 90 and bracket 98 additionally serve the purpose of limiting or preventing rotation of the buckle mounted belt tensioner assembly 80 when activated and/or loaded by an occupant in a collision or as a result of a pre-impact, driver notification or vehicle re-stabilization activation. A notch 100 is formed at one end of the seat mounted bracket 94. A fastener 102 in the form of a screw is provided.

Installation of the serviceable buckle mounted belt tensioner assembly 80 on the seat mounted bracket 94 initially includes alignment of the load carrying pin 96 with the pin aperture 88, alignment of the locating tab 90 with the notch 100, and alignment of the small bracket 98 with the attachment tab 92. Once in alignment, the serviceable buckle mounted belt tensioner assembly 80 is fitted against the seat mounted bracket 94. The screw 102 is threaded to attach the attachment tab 92 to the small bracket 98. Removal is performed in reverse order.

Figure 7:
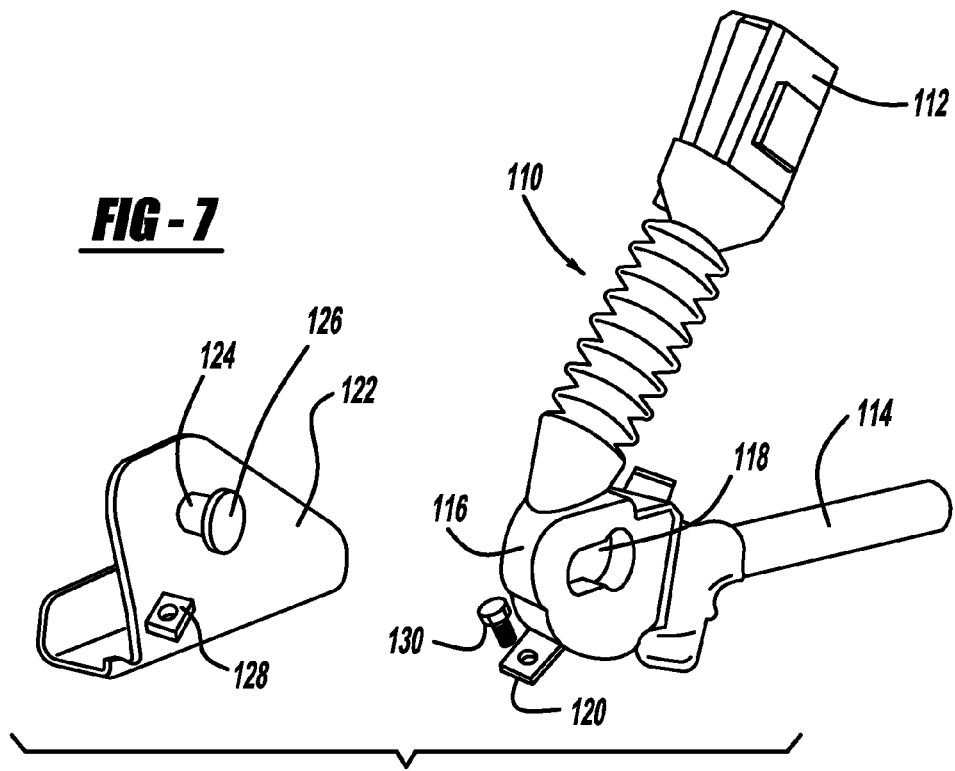
FIG. 7 illustrates a perspective view of a third alternate embodiment of the serviceable buckle mounted belt tensioner assembly of the present invention shown in relation to its associated seat mounting component.

With respect to FIG. 7, a third alternate embodiment of the present invention is illustrated. Specifically, a serviceable buckle mounted belt tensioner assembly 110 is shown and includes a seatbelt buckle 112 and a cylindrical container 114. The seatbelt buckle 112 and the cylindrical container 114 are attached to a housing 116. An elongated pin aperture 118 is formed through the housing 116. A locating and attachment tab or bracket 120 having a threaded aperture or fitted with a weldnut extends from the rearward-in-vehicle end of the housing 116. A seat mounted bracket 122 is provided for attachment to the seat frame (not shown). A structural attachment pin 124 having a larger head or cap 126 is attached to the seat mounted bracket 122. A small tab or bracket 128 extends laterally from the seat mounted bracket 122. The structural pin 124 and the tabs or brackets 128 and 120 are integral with or are attached to their respective bracket 122 or housing 116.

Installation of the serviceable buckle mounted belt tensioner assembly 110 on the seat mounted bracket 122 initially includes the alignment and insertion of the attachment pin 124 into the larger opening portion of the elongated pin aperture 118. Once the attachment pin 124 is inserted into the larger pin opening portion of the elongated pin aperture 118, the serviceable buckle mounted belt tensioner assembly 110 is moved vehicle forward so that the attachment pin 124 is moved into the smaller pin opening portion of the elongated pin aperture 118. In this position the underside of the cap 126 will engage the adjacent surface of the elongated pin aperture 118. Thus positioned the locating tab 120 will be in position over the small bracket 128. A threaded fastener 130 is provided for securing the serviceable buckle mounted belt tensioner assembly 110 against movement relative to the seat mounted bracket 122. Removal is performed in reverse order.

Figure 8:
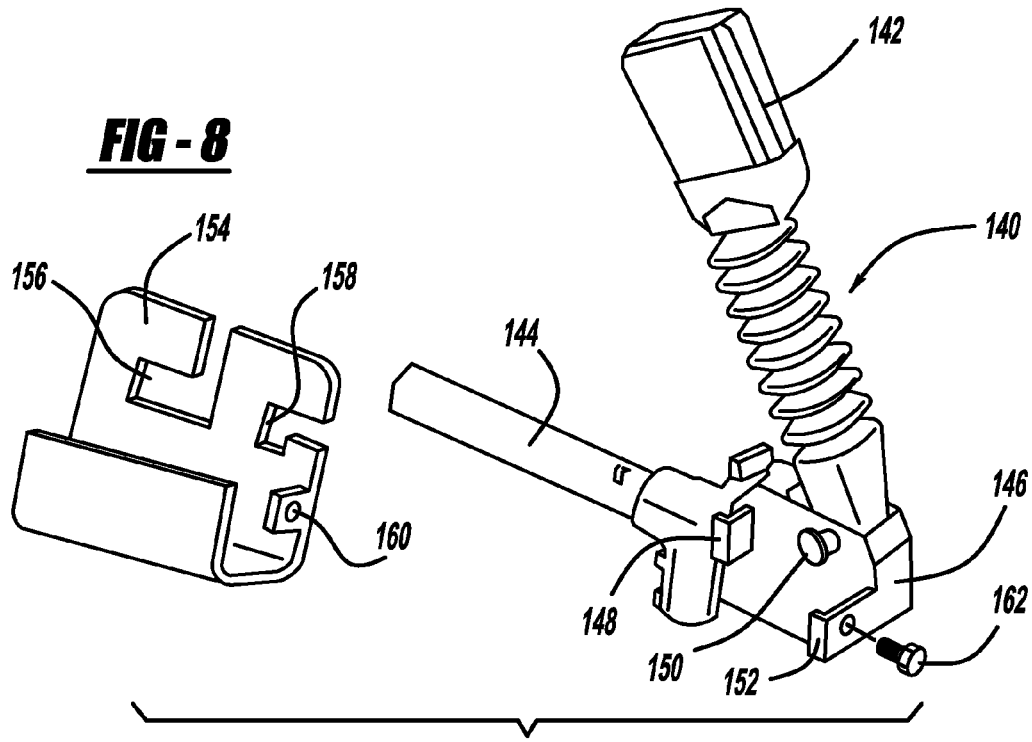
FIG. 8 illustrates a perspective view of a fourth alternate embodiment of the serviceable buckle mounted belt tensioner assembly of the present invention shown in relation to its associated seat mounting component.

With respect to FIG. 8, a fourth alternate embodiment of the present invention is illustrated. Specifically, a serviceable buckle mounted belt tensioner assembly 140 is shown and includes a seatbelt buckle 142 and a cylindrical container 144. The seatbelt buckle 142 and the cylindrical container 144 are attached to a housing 146. An anti-rotation tab 148 extends from the housing 146 as does a structural pin 150 and a locating/anti-rotation tab 152. A seat mounted bracket 154 is provided for attachment to the seat frame (not shown). The seat mounted bracket 154 includes a forward slot 156 and a rearward slot 158. An alignment tab 160 is also provided on the seat mounted bracket 154. A fastener 162 is provided for fixedly attaching the serviceable buckle mounted belt tensioner assembly 140 to the seat mounted bracket 154.

Installation of the serviceable buckle mounted belt tensioner assembly 140 on the seat mounted bracket 154 initially includes alignment of the anti-rotation tab 148 with respect to the forward slot 156 and alignment of the structural pin 150 with respect to the rearward slot 158. The anti-rotation tab 148 and the structural pin 150 are then inserted into the forward slot 156 and the rearward slot 158 respectively. Once inserted, the serviceable buckle mounted belt tensioner assembly 140 is then moved vehicle forward until the anti-rotation tab 148 and the structural pin 150 both bottom out in the forward slot 156 and in the rearward slot 158 respectively, and the locating tab 152 abuts the alignment tab 160. The fastener 162 is then attached to prevent separation of the serviceable buckle mounted belt tensioner assembly 140 from the seat mounted bracket 154. Removal is performed in the reverse order.

Figure 9:
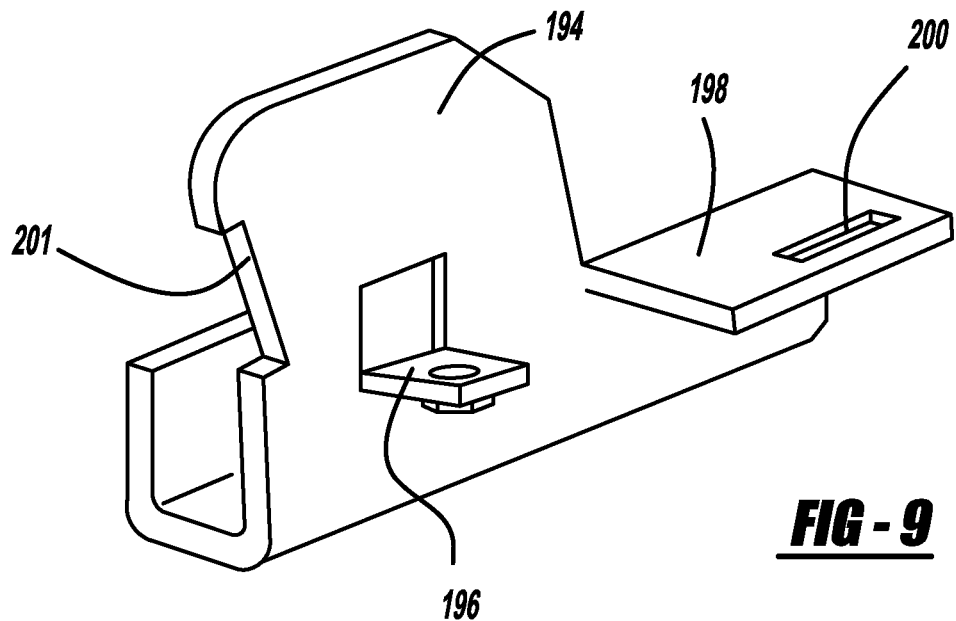
FIG. 9 illustrates a perspective view of a seat mounting component used in a association with a fifth alternate embodiment of the serviceable buckle mounted belt tensioner assembly of the present invention.
Figure 10:
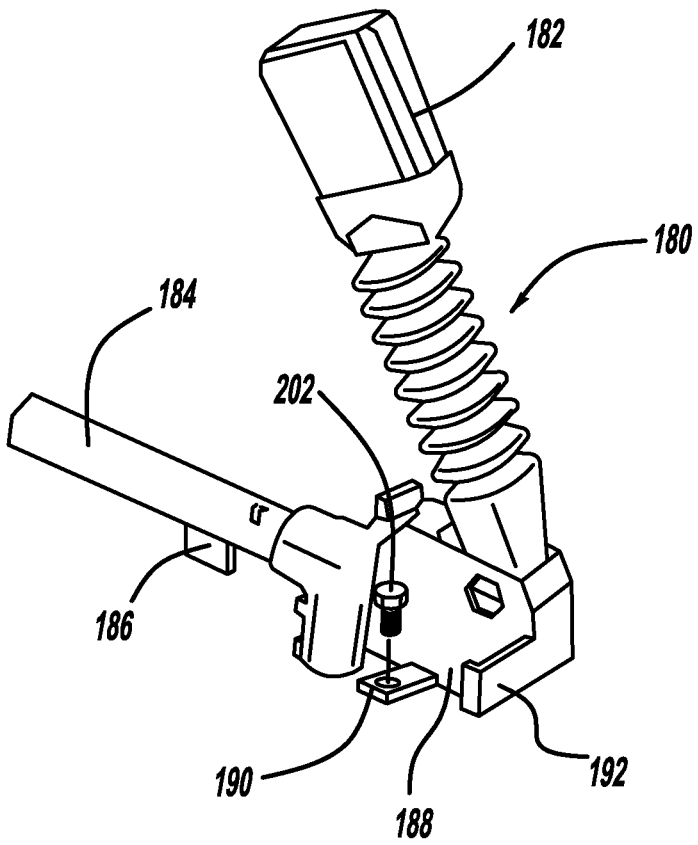
FIG. 10 illustrates a perspective view of a fifth alternate embodiment of the serviceable buckle mounted belt tensioner assembly used in conjunction with the mounting component shown in FIG. 9.
Figure 11:
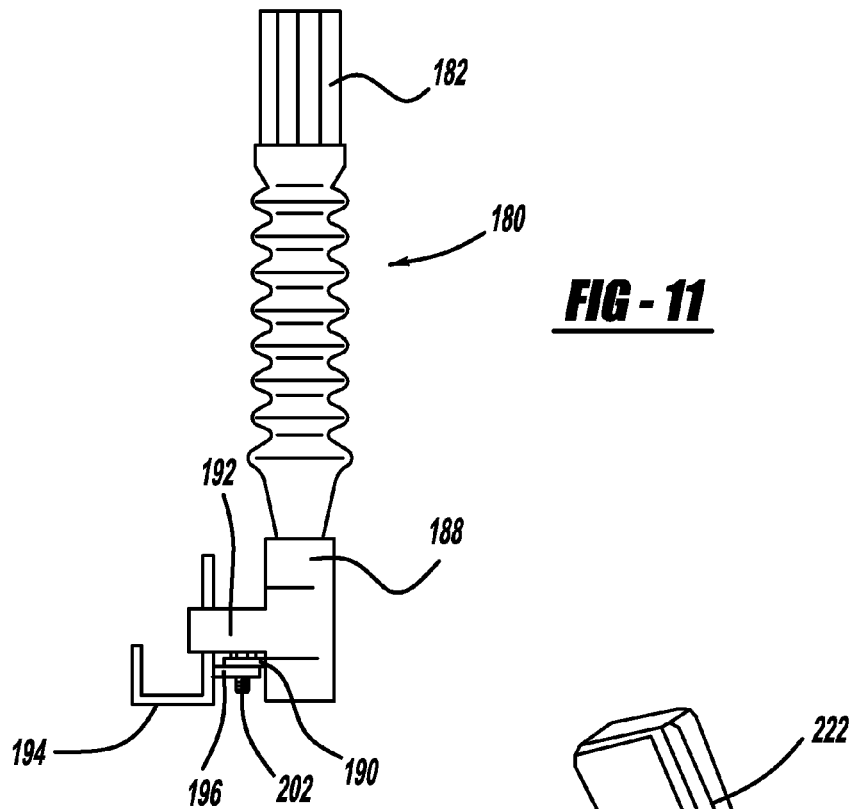
FIG. 11 illustrates a rear view of the fifth alternate embodiment of the serviceable buckle mounted belt tensioner assembly shown attached to the mounting component shown in FIG. 9.

With respect to FIGS. 9 through 11, a fifth alternate embodiment of the present invention is illustrated. Specifically, a serviceable buckle mounted belt tensioner assembly 180 is shown and includes a seatbelt buckle 182 and a cylindrical container 184. An alignment tab 186 is attached to the underside of the cylindrical container 184 and extends therefrom. The seatbelt buckle 182 and the cylindrical container 184 are attached to a housing 188. Extending laterally from the inner side of the housing 188 is a small bracket 190 and a locating tab 192. A seat mounted bracket 194 is provided for attachment to the seat frame (not shown). A small bracket 196 extends from the seat mounted bracket 194 as does an attachment flange 198. A slot 200 is defined in the attachment flange 198 for receiving the alignment tab 186 of the cylindrical container 184. An alignment notch 201 is formed at one end of the seat mounted bracket 194. A fastener 202 is provided for fixing the serviceable buckle mounted belt tensioner assembly 180 to the seat mounted bracket 194.

Installation of the serviceable buckle mounted belt tensioner assembly 180 on the seat mounted bracket 194 initially includes alignment of tab 186 with respect to the slot 200 of the attaching flange 198 and alignment of the locating tab 192 with the alignment notch 201. The locating tab 192 is then fitted to the alignment notch 201 while the alignment tab 186 is inserted into the slot 200 until the area of the underside of the cylindrical container 184 adjacent to the alignment tab 186 bottoms out against the attaching flange 198 and the attachment tab 190 abuts the small bracket 196 of the seat mounted bracket 194. The fastener 202 is then inserted to lock the serviceable buckle mounted belt tensioner assembly 180 against the seat mounted bracket 194. FIG. 11 illustrates the final assembly of the serviceable buckle mounted belt tensioner assembly 180 relative to the seat mounted bracket 194 having the fastener 202 fitted thereto. Removal is performed in the reverse order.

Figure 12:
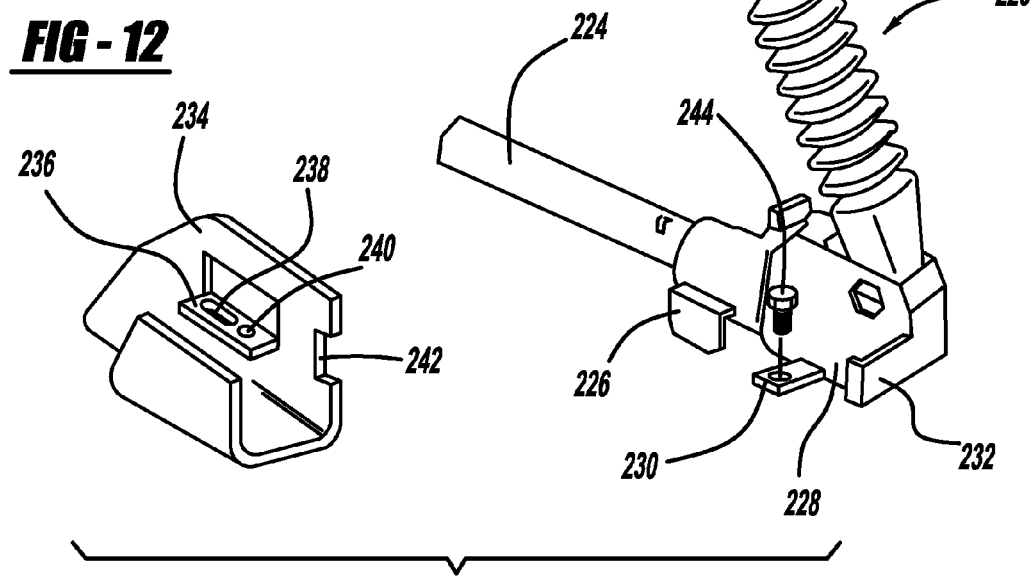
FIG. 12 illustrates a perspective view of a sixth alternate embodiment of the serviceable buckle mounted belt tensioner assembly of the present invention shown in relation to its associated seat mounting component.

With respect to FIG. 12, a sixth alternate embodiment of the present invention is illustrated. Specifically, a serviceable buckle mounted belt tensioner assembly 220 is shown and includes a seatbelt buckle 222 and a cylindrical container 224. Extending from the housing 228, or cylindrical container 224, is an alignment tab 226. The seatbelt buckle 222 and the cylindrical container 224 are attached to a housing 228. Extending laterally from the inner side of the housing 228 is a small bracket 230 and a locating tab 232. A seat mounted bracket 234 is provided for attachment to the seat frame (not shown). An attachment flange 236 extends inwardly relative to a wall of the seat mounted bracket 234. An alignment slot 238 is defined in the attachment flange 236 as is a threaded fastener receptacle 240. An alignment notch 242 is formed in one end of the seat mounted bracket 234. A fastener 244 is provided for fixing the serviceable buckle mounted belt tensioner assembly 220 to the seat mounted bracket 234.

Installation of the serviceable buckle mounted belt tensioner assembly 220 on the seat mounted bracket 234 initially includes alignment of tab 226 with respect to the slot 238 of the attaching flange 236 and alignment of the locating tab 232 with the alignment notch 242. The locating tab 232 is then fitted to the alignment notch 242 while the alignment tab 226 is inserted into the slot 238 until the uppermost portion of the alignment tab 226 which defines a supporting wall bottoms out against the attaching flange 236 and the attachment tab 230 abuts the attaching flange 236 of the seat mounted bracket 234. The fastener 244 is then inserted to lock the serviceable buckle mounted belt tensioner assembly 220 against the seat mounted bracket 234.

Figure 13:
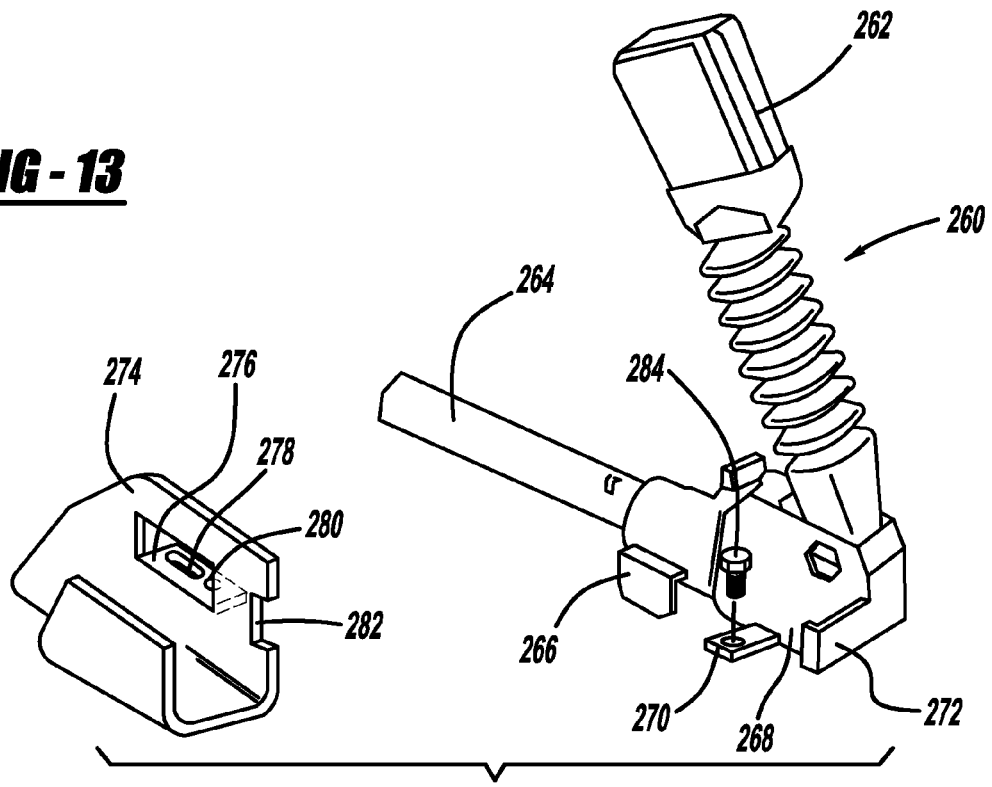
FIG. 13 illustrates a perspective view of a seventh alternate embodiment of the serviceable buckle mounted belt tensioner assembly of the present invention shown in relation to its associated seat mounting component.

With respect to FIG. 13, a seventh alternate embodiment of the present invention is illustrated. The seventh alternate embodiment shown in FIG. 13 is almost identical to the sixth alternate embodiment shown in FIG. 12 except for the construction of the seat mounted bracket.

Specifically, a serviceable buckle mounted belt tensioner assembly 260 is shown and includes a seatbelt buckle 262 and a cylindrical container 264. Extending from the housing 268, or cylindrical container 264, is an alignment tab 266. The seatbelt buckle 262 and the cylindrical container 264 are attached to a housing 268. Extending laterally from the inner side of the housing 268 is an attachment tab 270 and a locating tab 272. A seat mounted bracket 274 is provided for attachment to the seat frame (not shown). An attachment flange 276 extends outwardly relative to a wall of the seat mounted bracket 274, as opposed to inward extension of the same bracket in the sixth alternate embodiment discussed above with respect to FIG. 12. An alignment slot 278 is defined in the attachment flange 276 as is a threaded fastener receptacle 280. An alignment notch 282 is formed in one end of the seat mounted bracket 274. A fastener 284 is provided for fixing the serviceable buckle mounted belt tensioner assembly 260 to the seat mounted bracket 274.

Installation of the serviceable buckle mounted belt tensioner assembly 260 on the seat mounted bracket 274 initially includes alignment of the of the alignment tab 266 with respect to the slot 278 of the attaching flange 276 and alignment of the locating tab 272 with the alignment notch 282. The locating tab 272 is then fitted to the alignment notch 282 while the alignment tab 266 is inserted into the slot 278 until the uppermost portion of the alignment tab 266 which defines a supporting wall bottoms out against the attaching flange 276 and the attachment tab 270 abuts the attaching flange 276 of the seat mounted bracket 274. The fastener 284 is then inserted to lock the serviceable buckle mounted belt tensioner assembly 260 against the seat mounted bracket 274.

Figure 14:
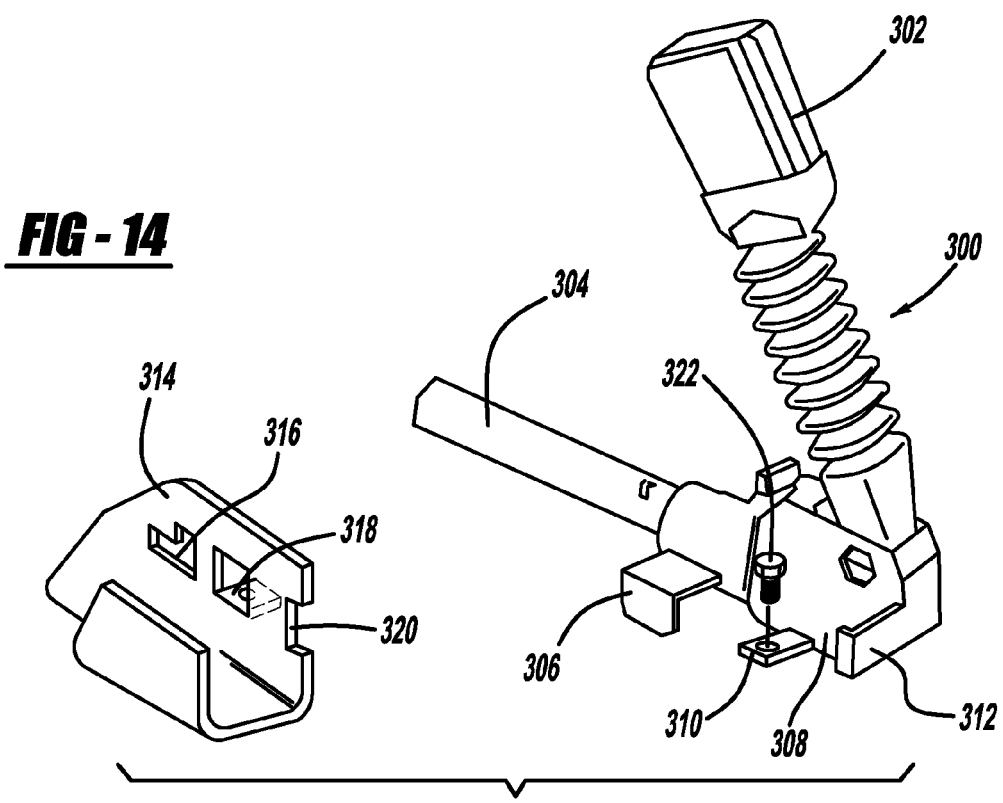
FIG. 14 illustrates a perspective view of an eighth alternate embodiment of the serviceable buckle mounted belt tensioner assembly of the present invention shown in relation to its associated seat mounting component.

With respect to FIG. 14, an eighth alternate embodiment of the present invention is illustrated. Specifically, a serviceable buckle mounted belt tensioner assembly 300 is shown and includes a seatbelt buckle 302 and a cylindrical container 304. Extending from the housing 308, or cylindrical container 304, is an alignment tab 306. The seatbelt buckle 302 and the cylindrical container 304 are attached to a housing 308. Extending laterally from the inner side of the housing 308 is an attachment tab 310 and a locating tab 312. A seat mounted bracket 314 is provided for attachment to the seat frame (not shown). A notch 316 is defined in a wall of the seat mounted bracket 314 and a small bracket 318 extends laterally therefrom. An alignment notch 320 is formed at one end of the seat mounted bracket 314. A fastener 322 is provided for fixing the serviceable buckle mounted belt tensioner assembly 300 to the seat mounted bracket 314.

Installation of the serviceable buckle mounted belt tensioner assembly 300 on the seat mounted bracket 314 initially includes the alignment of tab 306 with the notch 316 and alignment of the attachment tab 310 generally relative to the small bracket 318. The alignment tab 306 is then inserted into the notch 316 and the serviceable buckle mounted belt tensioner assembly 300 is then moved downward and vehicle forward relative to the seat mounted bracket 314 until the alignment tab 306 abuts against the forward wall of the notch 316 and until the locating tab 312 abuts the alignment notch 320. With forward travel thus arrested, the attachment tab 310 will be positioned over and in contact with the small bracket 318. The fastener 322 is then installed and the serviceable buckle mounted belt tensioner assembly 300 will be fixed to the seat mounted bracket 314. Removal is performed in the reverse order.

Figure 15:
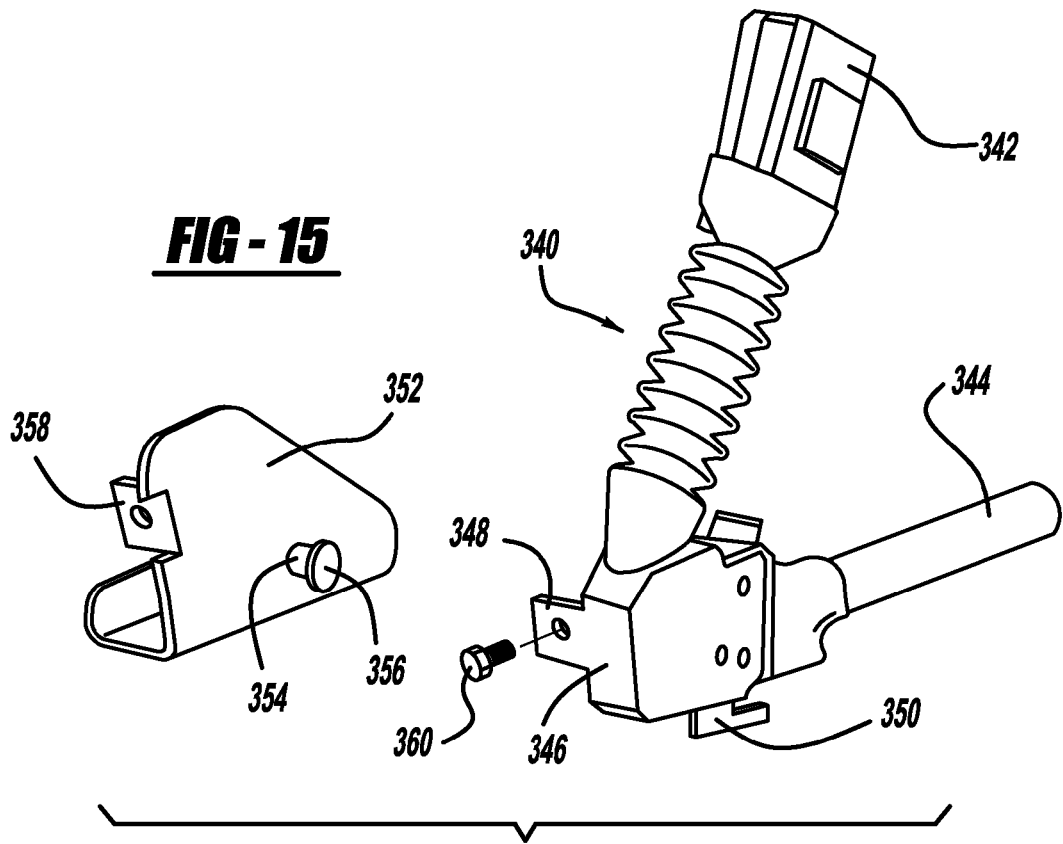
FIG. 15 illustrates a perspective view of a ninth alternate embodiment of the serviceable buckle mounted belt tensioner assembly of the present invention shown in relation to its associated seat mounting component.

With respect to FIG. 15, a ninth alternate embodiment of the present invention is illustrated. Specifically, a serviceable buckle mounted belt tensioner assembly 340 is shown and includes a seatbelt buckle 342 and a cylindrical container 344. The seatbelt buckle 342 and the cylindrical container 344 are attached to a housing 346. A locating tab 348 extends laterally from the inner side of the housing 346. A hook flange 350 extends from the underside of the housing 346. A seat mounted bracket 352 is provided for attachment to the seat frame (not shown). An attachment pin 354 having a cap 356 is attached to the seat mounted bracket 352. A small bracket 358 (adjacent an alignment notch) extends laterally inwardly from the seat mounted bracket 352. A fastener 360 is provided for fixing the serviceable buckle mounted belt tensioner assembly 340 to the seat mounted bracket 352.

Installation of the serviceable buckle mounted belt tensioner assembly 340 on the seat mounted bracket 352 initially includes alignment of the hook flange 350 adjacent the attachment pin 354 and alignment of the locating tab 348 adjacent (but spaced apart from) the small bracket 358. Once in alignment, the serviceable buckle mounted belt tensioner assembly 340 is moved vehicle forward relative to the seat mounted bracket 352 until the attachment pin bottoms out against the inner wall of the hook area of the hook flange 350 and the locating tab 348 bottoms out against the small bracket 358. The fastener 360 is then installed and the serviceable buckle mounted belt tensioner assembly 340 is fixed to the seat mounted bracket 352. Removal is performed in the reverse order.

Figure 16:
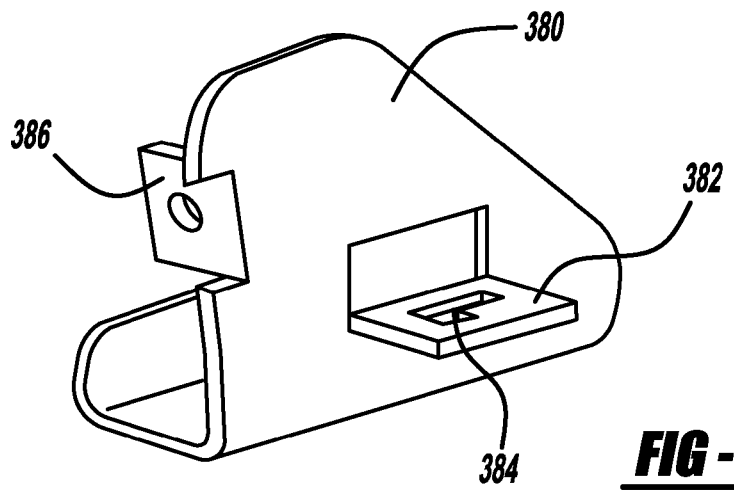
FIG. 16 illustrates a perspective view of a seat mounting component used in a association with a tenth alternate embodiment of the serviceable buckle mounted belt tensioner assembly of the present invention.
Figure 17:
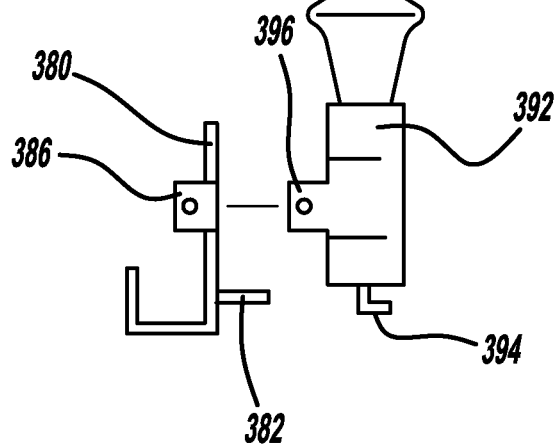
FIG. 17 illustrates a rear view of the tenth alternate embodiment of the serviceable buckle mounted belt tensioner assembly shown attached to the seat mounting component shown in FIG. 16.

With respect to FIGS. 16 and 17, a tenth alternate embodiment of the present invention is illustrated. Specifically, a seat mounted bracket 380 is provided for attachment to the seat frame (not shown). An attachment flange 382 extends laterally outwardly from the seat mounted bracket 380. An attachment notch 384 is defined in the attachment flange 382. As illustrated, the attachment notch 384 has a wider portion and a narrower portion. A small bracket 386 extends laterally inwardly from the seat mounted bracket 380. The tenth alternate embodiment further includes a serviceable buckle mounted belt tensioner assembly 388 which includes a seatbelt buckle 390 and a cylindrical container which, while not shown in the views, is the same as the cylindrical containers shown in some of the other figures and discussed above with respect to these figures. The seatbelt buckle 390 and the cylindrical container are attached to a housing 392. An L-shaped bracket 394 extends from the bottom side of the housing 392. An attachment tab 396 extends laterally inwardly from the housing 392. A fastener (not shown) is provided for fixing the serviceable buckle mounted belt tensioner assembly 388 to the seat mounted bracket 380.

Installation of the serviceable buckle mounted belt tensioner 388 on the seat mounted bracket 380 initially includes alignment of the L-shaped bracket 394 generally above the wider portion of the attachment notch 384. The L-shaped bracket 394 is then inserted into the wider portion of the attachment notch 384 until the underside of the housing 392 bottoms out on the upper side of the attachment flange 382. The serviceable buckle mounted belt tensioner 388 is then moved vehicle forward until the L-shaped bracket 394 bottoms out against the forward wall of the narrower portion of the attachment notch 384 and the attachment tab 396 fully abuts the outer wall of the small bracket 386. The fastener (not shown) is then installed and the serviceable buckle mounted belt tensioner assembly 388 is fixed to the seat mounted bracket 380. Removal is performed in the reverse order.

Figure 18:
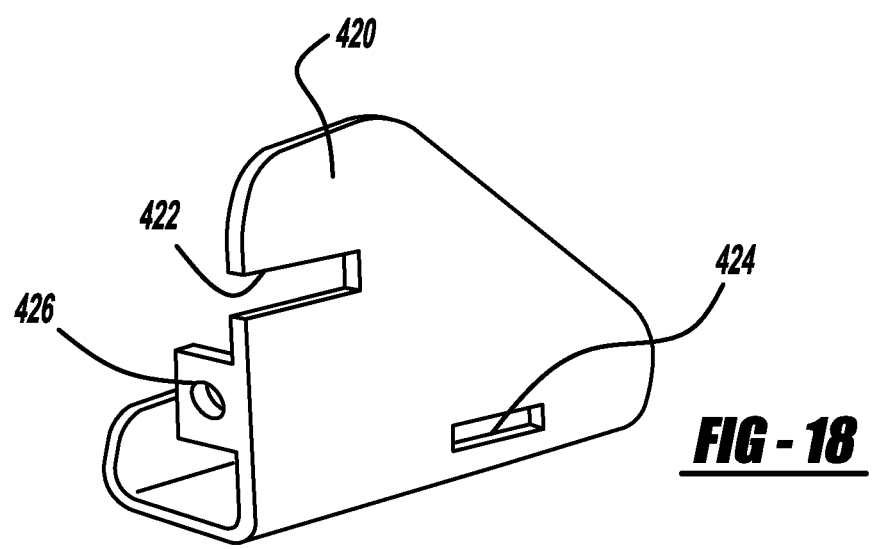
FIG. 18 illustrates a perspective view of a seat mounting component used in a association with an eleventh alternate embodiment of the serviceable buckle mounted belt tensioner assembly of the present invention.
Figure 19:
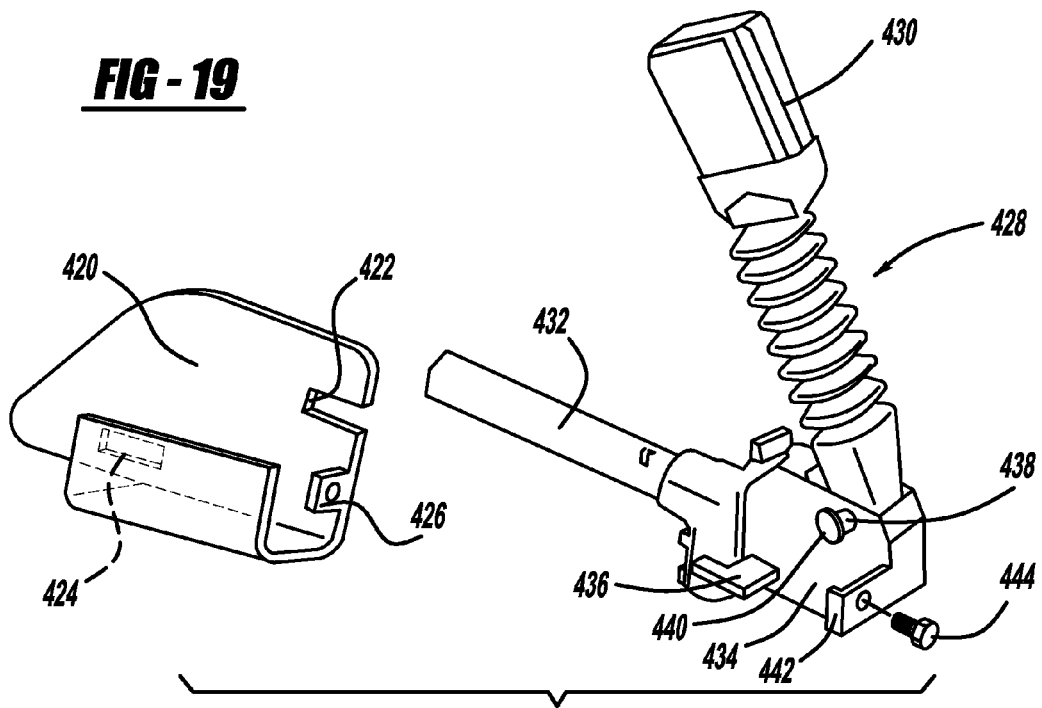
FIG. 19 illustrates a perspective view of the opposite side of the seat mounting component from the side shown in FIG. 18 for use with the eleventh alternate embodiment of the serviceable buckle mounted belt tensioner assembly of the present invention shown in relation thereto.

With respect to FIGS. 18 and 19, an eleventh alternate embodiment of the present invention is illustrated. Specifically, a seat mounted bracket 420 is provided for attachment to the seat frame (not shown). A first attachment notch 422 is formed at one end of the seat mounted bracket 420. A second attachment notch 424 (shown in broken lines) is provided toward the forward end of the seat mounted bracket 420. An attachment flange 426 extends inwardly from the outer wall of the seat mounted bracket 420.

A serviceable buckle mounted belt tensioner assembly 428 is shown and includes a seatbelt buckle 430 and a cylindrical container 432. The seatbelt buckle 430 and the cylindrical container 432 are attached to a housing 434. An attachment hook 436 extends laterally from the side of the housing 434. An attachment pin 438 having a cap 440 also extends laterally from this same side of the housing 434, as does a locating tab 442. A fastener 444 is provided for fixing the serviceable buckle mounted belt tensioner assembly 428 to the seat mounted bracket 420.

Installation of the serviceable buckle mounted belt tensioner assembly 428 on the seat mounted bracket 420 initially includes the alignment of the attachment hook 436 adjacent the second attachment notch 424, alignment of the cap 440 of the attachment pin 438 adjacent the first attachment notch 422, and alignment of the locating tab 442 adjacent the attachment flange 426. The hook portion of the attachment hook 436 is then inserted into the second attachment notch 424 as the cap 440 of the attachment pin 438 is inserted into the first attachment notch 422. Thus positioned, the serviceable buckle mounted belt tensioner assembly 428 is translated vehicle forward on the seat mounted bracket 420 until the attachment hook 436 bottoms out against the forward wall of the second attachment notch 424, the attachment pin 438 bottoms out against the forward wall of the first attachment notch 422, and the locating tab 442 abuts the attachment flange 426. The fastener 444 is then attached. Removal is performed in the reverse order.

Figure 20:
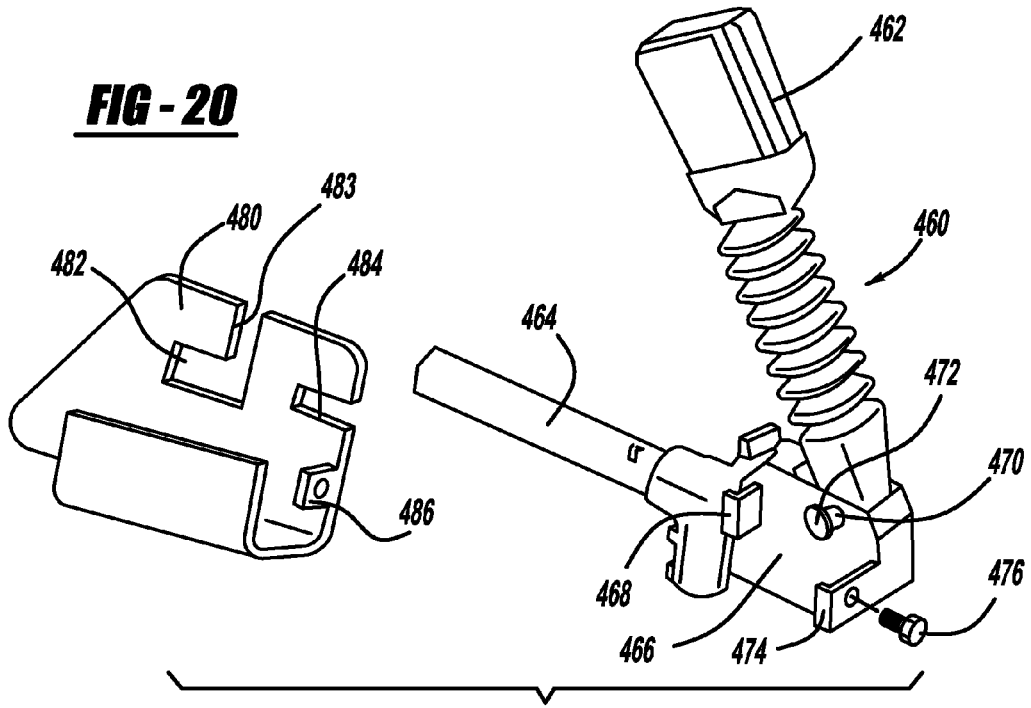
FIG. 20 illustrates a perspective view of a twelfth alternate embodiment of the serviceable buckle mounted belt tensioner assembly of the present invention shown in relation to its associated seat mounting component.

With respect to FIG. 20, an arrangement similar to that shown in FIGS. 18 and 19 is illustrated. In FIG. 20 a twelfth alternate embodiment of the present invention is illustrated. Specifically, a serviceable buckle mounted belt tensioner assembly 460 is shown and includes a seatbelt buckle 462 and a cylindrical container 464. The seatbelt buckle 462 and the cylindrical container 464 are attached to a housing 466. An anti-rotation tab 468 extends laterally from the side of the housing 466. An attachment pin 470 having a cap 472 also extends laterally from this same side of the housing 466, as does a locating tab 474. A fastener 476 is provided for fixing the serviceable buckle mounted belt tensioner assembly 460 to a seat mounted bracket 480.

The seat mounted bracket 480 includes a forward slot 482 having an upwardly-extending opening 483 and a rearward slot 484. An alignment tab 486 is also provided on the seat mounted bracket 480.

Installation of the serviceable buckle mounted belt tensioner assembly 460 on the seat mounted bracket 480 initially includes the alignment of the anti-rotation tab 468 over the upwardly-extending opening 483. The serviceable buckle mounted belt tensioner assembly 460 is then moved downwardly, whereby the anti-rotation tab 468 is inserted into the forward slot 482 until it bottoms out against the lower wall of the forward slot 482, thus bringing the attachment pin 470 into position adjacent the rearward slot 484. The serviceable buckle mounted belt tensioner assembly 460 is then moved vehicle forward until the anti-rotation tab 468 and the attachment pin 470 bottom out against the forward walls of the forward slot 482 and the rearward slot 484 respectively, accompanied by the locating tab 474 abutting the alignment tab 486. The fastener 476 is then attached. Removal is performed in the reverse order.

Figure 21:
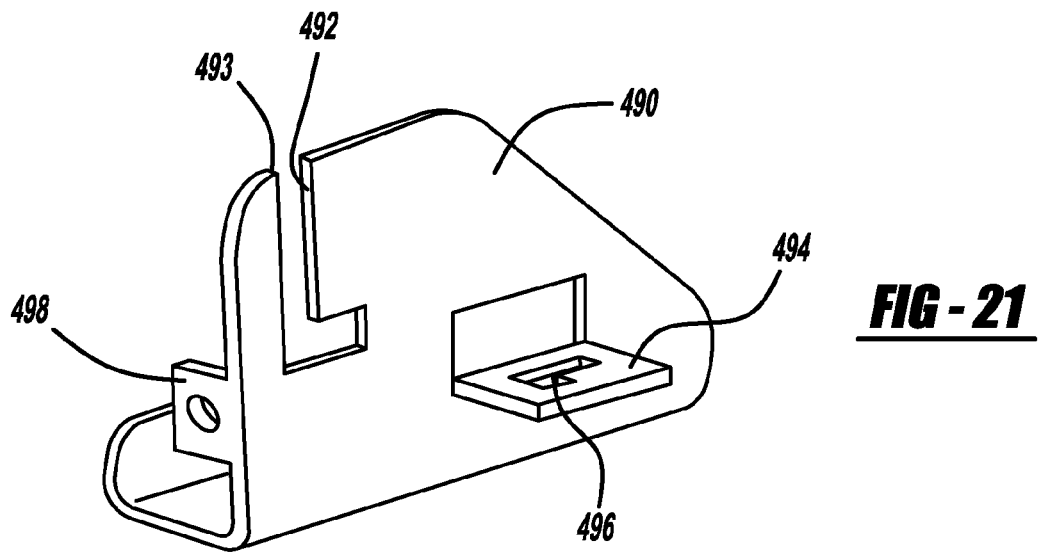
FIG. 21 illustrates a perspective view of a seat mounting component used in a association with an thirteenth alternate embodiment of the serviceable buckle mounted belt tensioner assembly of the present invention.
Figure 22:
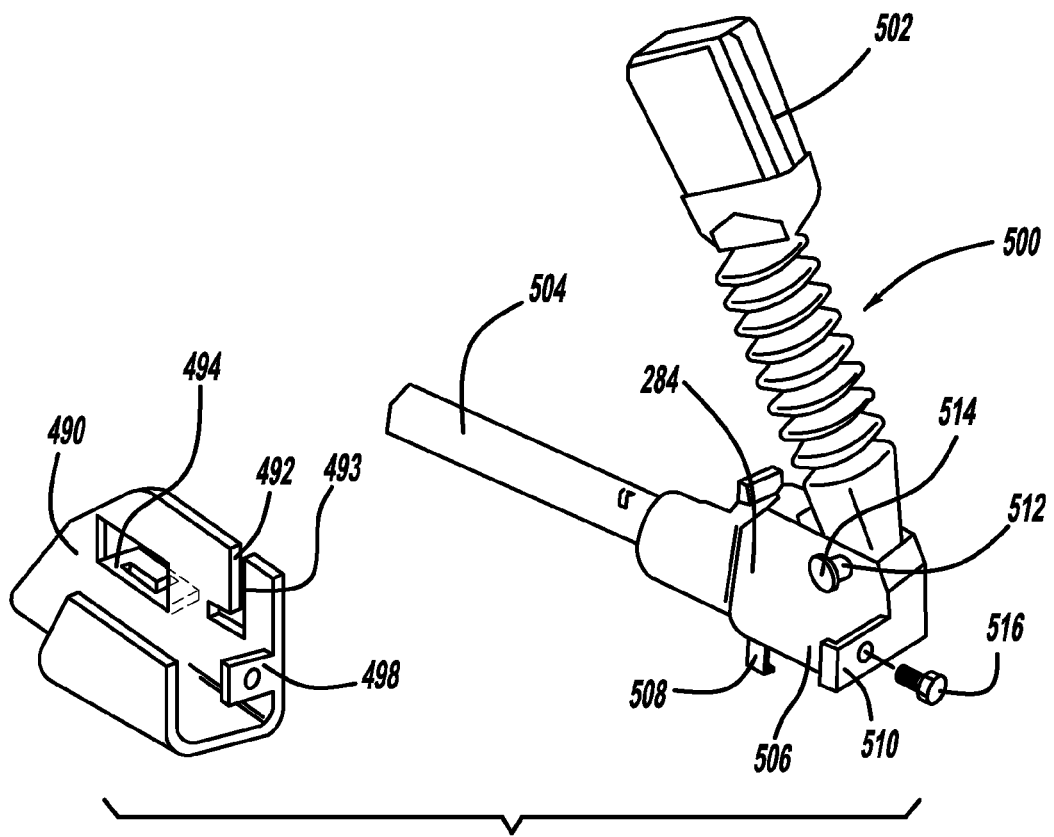
FIG. 22 illustrates a perspective view of the opposite side of the seat mounting component from the side shown in FIG. 21, for use with the thirteenth alternate embodiment of the serviceable buckle mounted belt tensioner assembly of the present invention shown in relation thereto.

With respect to FIGS. 21 and 22, a thirteenth alternate embodiment of the present invention is illustrated. Specifically, a seat mounted bracket 490 is illustrated. The seat mounted bracket 490 includes a slot 492 having an upwardly-extending opening 493. An attachment flange 494 extends laterally from the seat mounted bracket 490. A slot 496 is defined in the attachment flange 494, said slot having a wider portion. A locating tab 498 extends from the seat mounted bracket 490.

A serviceable buckle mounted belt tensioner assembly 500 is shown and includes a seatbelt buckle 502 and a cylindrical container 504. The seatbelt buckle 502 and the cylindrical container 504 at attached to a housing 506. An attachment hook 508 extends from the underside of the housing 506. An attachment pin 512 having a cap 514 extends laterally from the side of the housing 506, as does a locating tab 510. A fastener 516 is provided for fixing the serviceable buckle mounted belt tensioner assembly 500 to a seat mounted bracket 490.

Installation of the serviceable buckle mounted belt tensioner assembly 500 on the seat mounted bracket 490 initially includes positioning the attachment hook 508 over the wider portion of the slot 496 and the attachment pin 512 over the upwardly-extending opening 493 of the slot 492. The serviceable buckle mounted belt tensioner assembly 500 is then translated downwardly toward the seat base (not shown) until the underside of the housing 506 contacts the upper side of the attachment flange 494 and the attachment pin 512 bottoms out against the base wall of the slot 492. When so positioned the serviceable buckle mounted belt tensioner assembly 500 is then translated vehicle forward until the attachment hook 508 bottoms out against the forward wall of the slot 496, the attachment pin 512 bottoms out against the forward wall of the slot 492, and the locating tab 510 abuts the locating tab 498 of the seat mounted bracket 490. Thereafter the fastener 516 is attached. Removal is performed in the reverse order.

Figure 23:
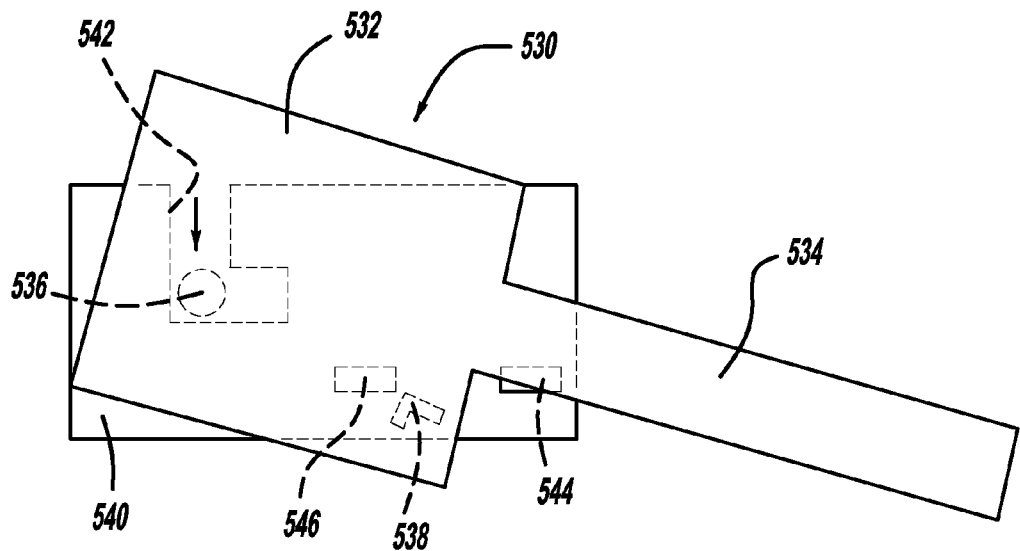
FIG. 23 illustrates a side view of the fourteenth alternate embodiment of the serviceable buckle mounted belt tensioner assembly of the present invention shown in conjunction with its associated seat mounting component, the serviceable buckle mounted belt tensioner assembly being positioned in its pre-attachment position.
Figure 24:
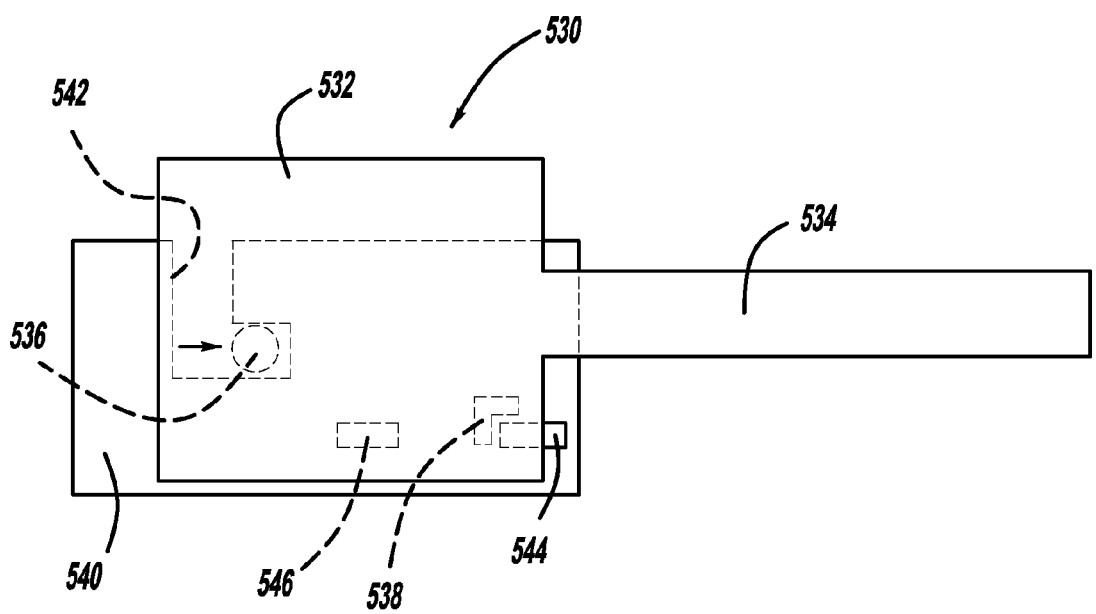
FIG. 24 is the same view as that of FIG. 23 but showing the serviceable buckle mounted belt tensioner assembly locked into place on the seat mounted bracket.

With respect to FIGS. 23 and 24, a side view of a fourteenth alternate embodiment of the present invention is illustrated. Specifically, a serviceable buckle mounted belt tensioner assembly 530 is shown and includes a housing 532 to which a cylindrical container 534 is attached. A seatbelt buckle is also attached to the housing 532 but is not shown. On the inner side of the housing 532 is provided a pin 536, illustrated in broken lines. Also provided on the inner side of the housing 532 is an L-shaped locating flange 538, also illustrated in broken lines.

A seat mounted bracket 540 is provided to which the serviceable buckle mounted belt tensioner assembly 530 is removably attached. The seat mounted bracket 540 includes a pin-receiving L-shaped slot 542, illustrated in broken lines, a forward alignment flange 544 shown partially in broken lines, and a rearward alignment flange 546, shown in broken lines.

Installation of the serviceable buckle mounted belt tensioner assembly 530 on the seat mounted bracket 540 initially includes clockwise rotation of the serviceable buckle mounted belt tensioner assembly 530 with the pin 536 positioned in the pin-receiving L-shaped slot 542. The desired position of the serviceable buckle mounted belt tensioner assembly 530 with respect to the seat mounted bracket 540 is generally illustrated in FIG. 23. Thereafter the serviceable buckle mounted belt tensioner assembly 530 is then rotated counterclockwise so that the L-shaped locating flange 538 is positioned generally between the forward alignment flange 544 and the rearward alignment flange 546. The serviceable buckle mounted belt tensioner assembly 530 is then slid vehicle forward until the pin 536 bottoms out against the forward wall of the L-shaped slot 542 and the L-shaped locating flange 538 abuts the forward alignment flange 544. A fastener such as a screw (not shown) is used to fasten the serviceable buckle mounted belt tensioner assembly 530 to the seat mounted bracket 540. Removal is performed in reverse order.

Thus described, the disclosed invention overcomes the limitations and difficulties of prior arrangements by providing serviceable buckle mounted belt tensioner assembly which may be readily attached to, and removed from, the seat mounted bracket allowing for easy removal and installation without requiring removal of the vehicle, center console or other peripheral vehicle components. While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims. It should be noted that the orientation, geometry and number of tabs, flanges, brackets, notches, slots, pins, and weldnuts may vary and the location of such features may be interchanged between seat track mounting brackets and the serviceable buckle mounted belt tensioner assembly while still providing the operational functionality.

What is claimed is:

1. A pre-tensioning system for use with a seatbelt restraint system associated with a vehicle seat mounted on a seat frame, the system comprising:
a bracket associated with the seat frame;
a belt tensioner assembly, a housing, a seatbelt attachment portion, and a cable at least partially passing through said housing and connecting with said seatbelt attachment portion, said housing having an aperture;
a shaft extending from said bracket through said aperture, said housing being attached to said shaft free of fastening mean.

2. The pre-tensioning system of claim 1 including a tab outwardly extending from said bracket and a tab extending outwardly from said housing, said tabs being matable with one another.

3. The pre-tensioning system of claim 1, wherein said shaft aperture in said housing is elongated.

4. The pre-tensioning system of claim 1, wherein said shaft defines a T-shaped connector and wherein said shaft aperture of said housing defines an elongated opening for receiving said T-shaped connector.

5. The pre-tensioning system of claim 1 wherein said retainer is a retaining clip for attachment to said shaft.

6. An apparatus for use in association with a vehicle seat assembly for tensioning a seatbelt operatively associated with the seat assembly to thereby tighten the seatbelt against a vehicle occupant, the apparatus comprising:
a bracket fixed to the seat assembly, the bracket having a shaft extending therefrom; and
a buckle mounted belt tensioner assembly having a housing, said housing having a shaft-receiving aperture, said housing being connected to said shaft free of fastening means.

7. The apparatus of claim 6 including a tab extending outwardly from said bracket and a tab extending outwardly from said housing, said tabs being matable with one another.

8. The apparatus of claim 6, wherein said shaft-receiving aperture in said housing is elongated.

9. The apparatus of claim 6, wherein said shaft defines a T-shaped connector and wherein said shaft-receiving aperture of said housing defines an elongated opening for receiving said T-shaped connector.

10. The apparatus of claim 6 further including a retaining clip for attachment to said shaft.

11. A method of attaching a seatbelt pretension assembly for a vehicle restraint system, the method comprising:
forming a vehicle seat having a seat frame;

forming a bracket and fixing said bracket to said seat frame, said bracket having a substantially vertical wall, said substantially vertical wall having a shaft extending therefrom, said shaft being unthreaded;

forming a pretension assembly having a housing, a seatbelt attachment portion, a drawing cylinder and a cable connecting said seatbelt attachment portion and said drawing cylinder, at least a portion of said cable passing through said housing, said housing having a shaft-receiving aperture formed therethrough; and mounting said pretension assembly on said bracket so that said shaft is inserted through said shaft-receiving aperture formed through said housing a buckle mounted belt tensioner assembly having a housing, said housing having a shaft-receiving aperture free of fastening means.

\* \* \* \* \*